(12) United States Patent
Narayanan

(10) Patent No.: US 9,949,142 B2
(45) Date of Patent: Apr. 17, 2018

(54) SMALL CELL SELF-VALIDATION AND PROVISIONING WITHOUT USING BACKHAUL

(71) Applicant: Verizon Patent and Licensing Inc., Arlington, VA (US)

(72) Inventor: Ram Gopal Lakshmi Narayanan, Pleasanton, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 215 days.

(21) Appl. No.: 14/856,926

(22) Filed: Sep. 17, 2015

(65) Prior Publication Data

US 2017/0086083 A1 Mar. 23, 2017

(51) Int. Cl.
*H04W 16/24* (2009.01)
*H04W 24/06* (2009.01)
*H04L 12/26* (2006.01)
*H04W 76/02* (2009.01)

(52) U.S. Cl.
CPC ......... *H04W 16/24* (2013.01); *H04L 43/0876* (2013.01); *H04W 24/06* (2013.01); *H04W 76/023* (2013.01)

(58) Field of Classification Search
CPC ..... H04W 16/26; H04W 16/24; H04W 16/30; H04W 16/28; H04W 16/32; H04W 24/02; H04W 24/04; H04W 24/06; H04W 24/08; H04W 48/16; H04W 72/0426; H04W 76/02; H04W 76/023; H04W 76/025; H04W 84/045
See application file for complete search history.

(56) References Cited

U.S. PATENT DOCUMENTS

| 9,042,901 | B2* | 5/2015 | Macias | H04W 52/0206 370/331 |
| 9,462,525 | B1* | 10/2016 | Malhotra | H04W 76/025 |
| 9,615,269 | B2* | 4/2017 | Henry | H04W 24/04 |
| 2013/0244669 | A1* | 9/2013 | Das | H04W 24/02 455/446 |
| 2013/0281089 | A1* | 10/2013 | Chandrasekhar | H04W 24/02 455/434 |
| 2014/0126527 | A1* | 5/2014 | Xiong | H04W 72/0413 370/329 |
| 2014/0185495 | A1* | 7/2014 | Kuchibhotla | H04W 76/023 370/281 |
| 2014/0307591 | A1* | 10/2014 | Wang | H04W 72/1231 370/278 |

(Continued)

OTHER PUBLICATIONS

3GPP TR 22.803, Technical Specification Group Services and Systems Aspects; Feasibility study for Proximity Services (ProSe) (Release 12). Jun. 28, 2013. Available at www.3gpp.org.

*Primary Examiner* — Anh-Vu Ly
*Assistant Examiner* — Roberta A Shand

(57) ABSTRACT

Small cell provisioning and validation may be performed, for small cells, in a small cell cluster, based on wireless cellular network connections (i.e., without requiring the use of a backhaul connection). In some implementations, the small cells may communicate with one another using direct Device-to-Device (D2D) communications. The D2D communications may be used to further enhance the network connectivity (i.e., to the cellular network and the OAM server) and to transmit test traffic during performance of the validation functions.

20 Claims, 11 Drawing Sheets

(56) References Cited

U.S. PATENT DOCUMENTS

| | | | | |
|---|---|---|---|---|
| 2014/0355562 A1* | 12/2014 | Gao | ................... | H04W 76/025 370/331 |
| 2015/0098319 A1* | 4/2015 | Yie | ...................... | H04L 5/0057 370/229 |

* cited by examiner

US 9,949,142 B2

SMALL CELL SELF-VALIDATION AND PROVISIONING WITHOUT USING BACKHAUL

BACKGROUND

The use of wireless networks, to support mobile data communications, continues to grow rapidly. One trend in the implementation of cellular wireless networks is the increasing reliance on heterogeneous networks (HetNets). A heterogeneous cellular network may include traditional macrocell base stations overlaid with small cells (femtocells, picocells, wireless relays, etc.). The small cells may include, relative to the macrocells, smaller form factor and lower power radio nodes. By deploying HetNets with targeted small cell installations, network operators can offload users from macrocells to small cells. This technique may be particularly useful in areas with poor radio reception and/or dense mobile device populations.

Small cells are often deployed in clusters, such as a cluster of small cells deployed in a shopping mall, office building, or stadium. In such a situation, small cells may be advantageous as individual small cells are relatively inexpensive and may thus be deployed in large numbers. The typical deployment procedure for macrocells may not be applicable to small cells. For example, when deploying a large number of relatively inexpensive small cells, using an on-site network technician to setup and configure each small cell may be prohibitively expensive.

DETAILED DESCRIPTION OF PREFERRED EMBODIMENTS

The following detailed description refers to the accompanying drawings. The same reference numbers in different drawings may identify the same or similar elements.

Techniques described herein relate to small cell provisioning and validation. Small cells, in a small cell cluster, may each include circuitry to form wireless cellular network connections. The small cells may use the circuitry to communicate with an operations, administration, and management (OAM) server on power-up, even when the normal backhaul connection for the small cell is not yet configured or available. The OAM server may control provisioning and validation of the small cells.

In some implementations, the small cells may communicate with one another using direct Device-to-Device (D2D) communications. The D2D communications may be used to further enhance the network connectivity (i.e., to the cellular network and the OAM server) and to transmit test traffic during performance of the validation functions.

Figure 1:
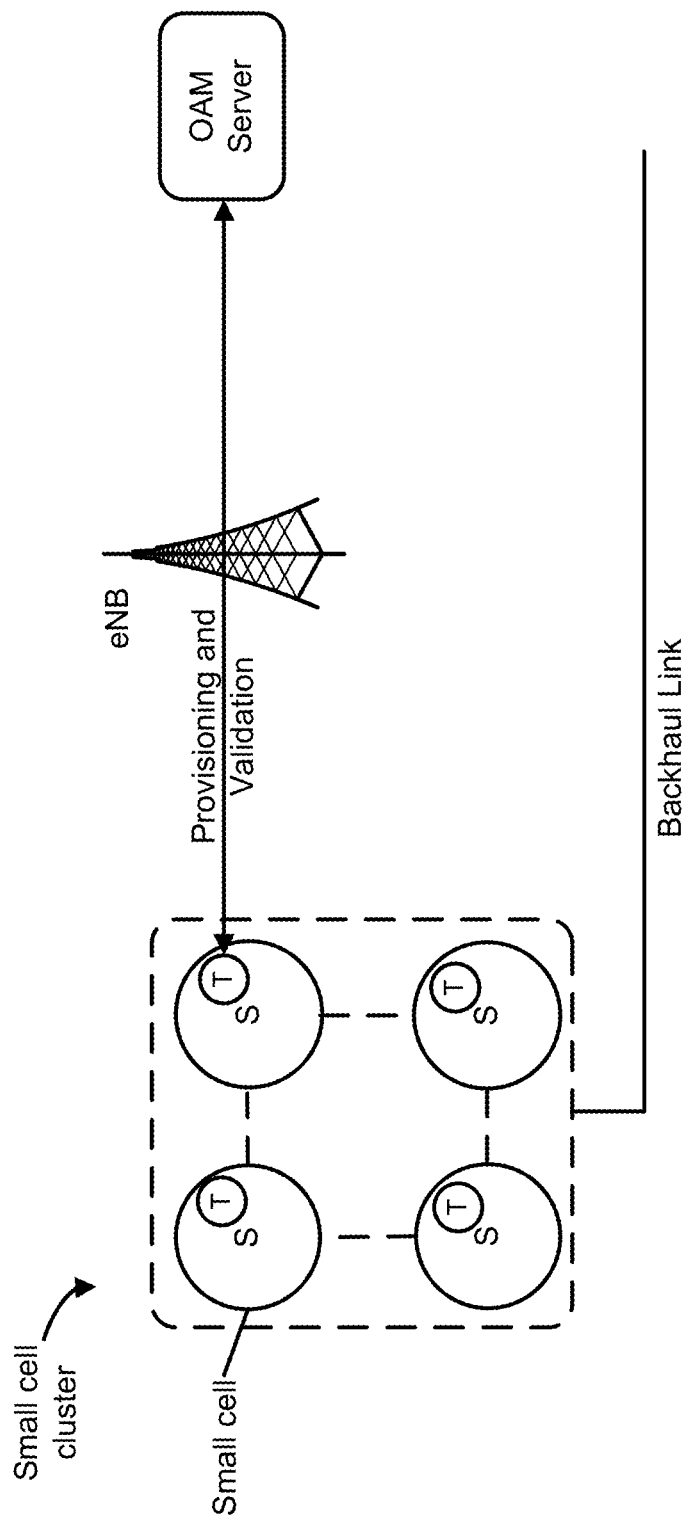
FIG. 1 is a diagram illustrating an example overview of implementations described herein.

FIG. 1 is a diagram illustrating an example overview of implementations described herein. As shown in FIG. 1, a macrocell in a cellular wireless network may be provided by a base station, which may be referred to as an Evolved Node B (eNB) in Long Term Evolution (LTE) networks. A small cell cluster, including a number of small cells (S), may provide supplemental coverage within the coverage area of the macrocell. Each small cell may provide radio coverage for User Equipment (UEs) in the vicinity of the small cell. User traffic may be forwarded, by the small cells, via a backhaul link, such as a wired connection to an Internet Service Provider (ISP) network associated with the small cell. Each small cell, in addition to the conventional small cell logic, may include transceiver logic ("T", also called LTE transceiver logic herein), and potentially other processing logic, to additionally enable direct wireless connections to a cellular communications network (e.g., to an LTE network).

When initially powered-up, the small cells may connect, using the LTE transceiver logic, to an OAM server associated with the cellular network. The OAM server may control automatic provisioning and validation of the small cells in the small cell cluster. The provisioning and validation may be performed without the use of the backhaul link. Additionally, the small cells may connect to one another using D2D techniques (shown as dashed lines in FIG. 1). The D2D connections may increase the coverage range of the small cells. For example, small cells that are out of the range of the eNB (e.g., a small cell in an interior of a building) may still be able to connect to the OAM server using the D2D links to obtain connectivity to a small cell that is within the coverage area of the eNB.

Figure 2:
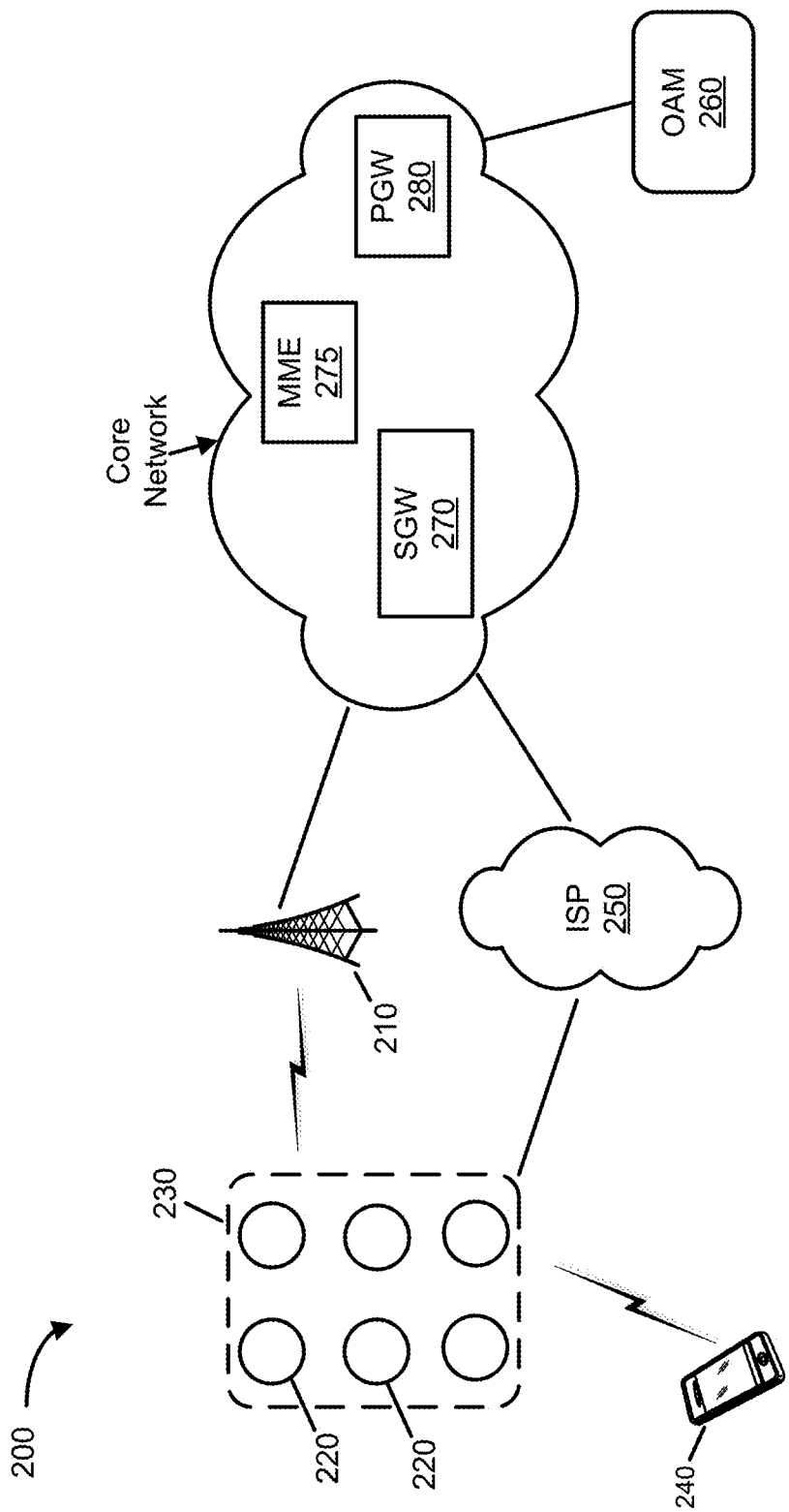
FIG. 2 is a diagram illustrating an example system in which techniques described herein may be implemented.

FIG. 2 is a diagram illustrating an example system 200 in which techniques described herein may be implemented. System 200 may include a cellular telecommunications network that enables UEs, such as user mobile devices or machine-to-machine (M2M) devices, to communicate with one another using wireless connections to the network. The cellular telecommunications network may include a core network portion and a radio access network (RAN) portion. The RAN portion may be implemented as a HetNet that includes a number of macrocells and small cells. In FIG. 2, a macrocell is illustrated by eNB 210 and small cells are illustrated as small cells 220. Small cells 220 may be deployed as a small cell cluster 230, in which multiple small cells are deployed in a particular building or other location (e.g., to provide coverage in a mall, office setting, etc.).

As is illustrated in FIG. 2, system 200 may additionally include mobile devices 240, ISP network 250, and OAM server 260. The core network may include a number of network devices. When the cellular telecommunications network includes a network based on the Third Generation Partnership Project (3GPP) Long Term Evolution (LTE) standards, the core network may include, for instance, an evolved packet core (EPC) that includes serving gateway (SGW) 270, mobility management entity device (MME) 275, and packet data network (PDN) gateway (PGW) 280.

eNB 210 may be a base station that provides macrocell coverage for the cellular telecommunications network. eNB 210 may cover a relatively large area (e.g., a typical cell radius may be on the order of 500 meters to few kilometer). eNB 210 may provide service to all users of a particular cellular telecommunications network. Small cells 220, on the other hand, may be provided by low-power radio nodes, such as femtocells (also called Home eNodeBs (HeNBs)) and picocells. A small cell 220 may include "closed" cells that provide service to a limited subset of users of the wireless network ("white-list" users) or "open" cells that provide service to all users of the particular wireless network. Small cells 220 may be deployed, by operators of the wireless network, to enhance or supplement the service areas of the wireless network. Macrocells, implemented by eNB 210, and small cells 220 may be deployed using the same radio frequency channel or same set of radio frequency channels. As described in additional detail below, small cells 220 may, in addition to including logic to implement typical small cell radio coverage (e.g., radio transceiver(s) to implement a small cell coverage area using licensed or unlicensed frequency bands), may additional include the ability to communicate with eNB 210. Small cells 220 may communicate with eNB 210 to automatically receive data relating to provisioning or validating small cells 220.

Mobile device 240 may include a UE, such as a portable computing and communication device, such as a personal digital assistant (PDA), a smart phone, a cellular phone, a laptop computer with connectivity to a cellular wireless network, a wearable device, a tablet computer, etc. Mobile device 240 may also include a non-portable computing device, such as a desktop computer, a consumer or business appliance, or another device that has the ability to connect to the cellular telecommunications network. Mobile device 240 may wirelessly communicate with the cellular telecommunications network using either eNB 210 and/or small cells 220.

ISP network 250 may include a network that is managed and/or owned by a network service provider that is different than the network provider that provides the cellular telecommunications network that serves mobile device 240. ISP network 250 may include a packet data network (PDN) that may be implemented using one or more wired and/or wireless networks. ISP network 250 may connect the small cells 220 to external networks, such as the core network. In some implementations, only some of small cells 220 may obtain network connectivity via ISP network 250. That is, a portion of small cells 220 may obtain network connectivity via ISP network 250 and another portion may be directly connected to the core network.

OAM server 260 may include one or more computing devices, such as a server device or a collection of server devices, capable of enabling remote monitoring and management of small cells 220. OAM server 260 may, for example, automatically control the provisioning and validation of small cells 220. The provisioning and validation of small cells 220 may be performed over licensed spectrum (i.e., through eNB 210). Although shown as being implemented externally to the core network, in some implementations, OAM server 260 may be implemented as part of the core network.

As previously mentioned, core network may include SGW 270, MME 275, and PGW 280. SGW 270 may include one or more computation and communication devices that route and forward user data packets. SGW 270 may also act as a mobility anchor during inter-eNB handoffs. MME 275 may include one or more computation and communication devices that perform signaling for the cellular telecommunications network. MME 275 may, for example, be responsible for authenticating mobile devices 240 and small cells 220, maintaining location information, and selecting a PGW 280 to service a particular mobile device 240 and small cell 220. PGW 280 may include one or more computation and communication devices that provide connectivity from small cells 220 to external packet data networks.

Figure 3:
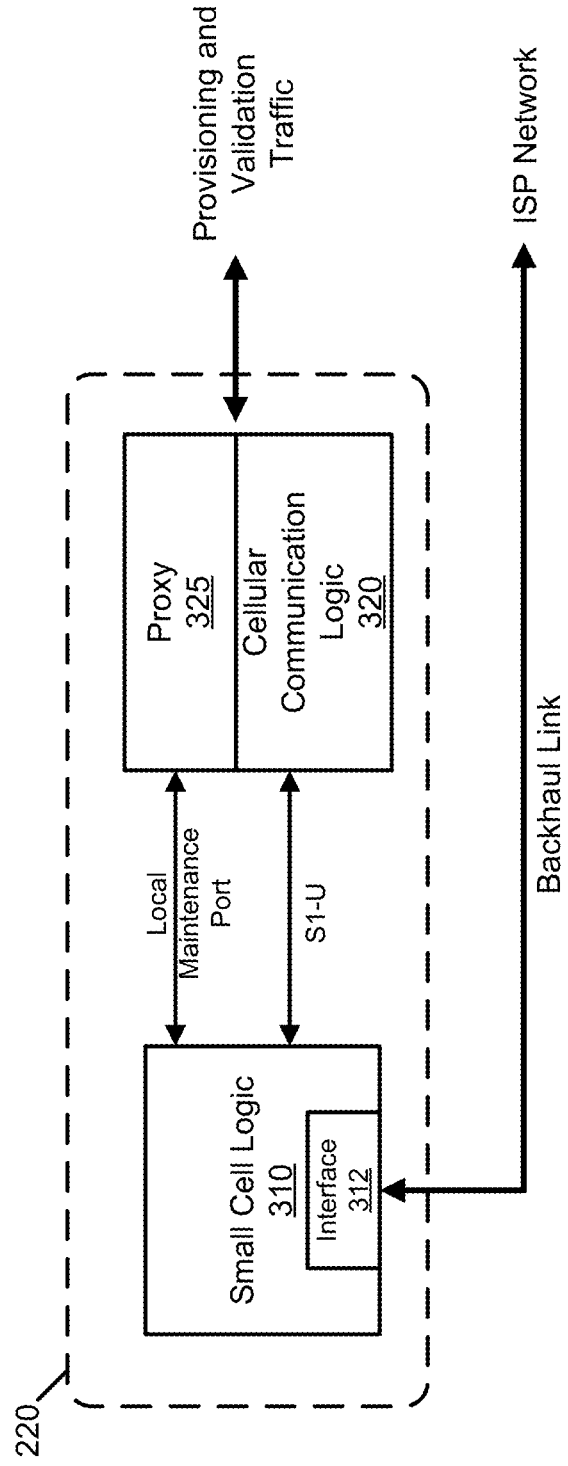
FIG. 3 is a diagram illustrating an example implementation of a small cell.

FIG. 3 is a diagram illustrating an example implementation of a small cell 220. Small cell 220 may include small cell logic 310, cellular communications logic 320, and proxy logic 325 Small cell logic 310 may represent existing small cell logic to provide small cell wireless coverage areas to mobile devices 240 to connect with the core network, such as using ISP network 250 to communicate the backhaul IP traffic associated with mobile devices 240. For example, small cell logic 310 may include a wired Ethernet port to connect to ISP network 250, radio transceiver circuitry (e.g., using either licensed or unlicensed frequency bands) to communicate with mobile devices 240, and control circuitry (e.g., a processor, memory, an Application Specific Integrated Circuit, etc.) to control small cell logic 310. As shown in FIG. 3, small cell logic 310 is particularly illustrated as including an interface 312. Interface 312 may represent, for example, a wired (e.g., Ethernet) port for connecting to the backhaul link.

Additionally, as shown in FIG. 3, small cell 220 includes cellular communications logic 320 and proxy logic 325. Cellular communications logic 320 may include, for example, radio transceiver circuitry for communicating with the cellular network (e.g., LTE communication logic for communicating with eNB 210). Proxy logic 325 may represent control circuitry (e.g., a processor, memory, an Application Specific Integrated Circuit, etc.) to control the provisioning and validation operations and to communicate with OAM server 260. In some implementations, cellular communications logic 320 may also communicate with other small cells 220, within small cell cluster 230. For example, and as will be described in more detail below, small cells 220 may implement D2D connections to provide additional connectivity options to OAM server 260 and to implement testing and validation procedures between small cells 220.

In one implementation, and as illustrated in FIG. 3, proxy logic 325 may be connected to small cell logic 310 via a local maintenance port, and cellular communication logic 320 may be connected to small cell logic 310 via the 3GPP S1-U interface. Via the local maintenance port, proxy logic 325 may cause small cell logic 310 to operate in "loopback mode." In loopback mode, data (e.g. cellular traffic) sent to small cell logic 310 over the S1-U interface may be processed and sent back ("loopbacked") to proxy logic 325.

Although small cells 220 are illustrated, in FIG. 3, as including separate small cell logic 310, cellular communication logic 320, and proxy logic 325, in some implementations, cellular communications logic 320 and proxy logic 325 may be implemented as part of the same circuit board or ASIC as small cell logic 310. Alternatively, cellular communications logic 320 and proxy logic 325 may be implemented as an add-on component, such as one that is plugged-in to the local maintenance port of small cell logic 310. In this situation, cellular communications logic 320 may be integrated within the same physical housing or within a different physical housing as small cell logic 310.

Although FIGS. 2 and 3 illustrate example components of system 200, in other implementations, system 200 may contain fewer components, different components, differently arranged components, or additional components than those depicted in FIGS. 2 and 3. Alternatively, or additionally, one or more components of system 200 may perform one or more other tasks described as being performed by one or more other components of system 200.

Figure 4:
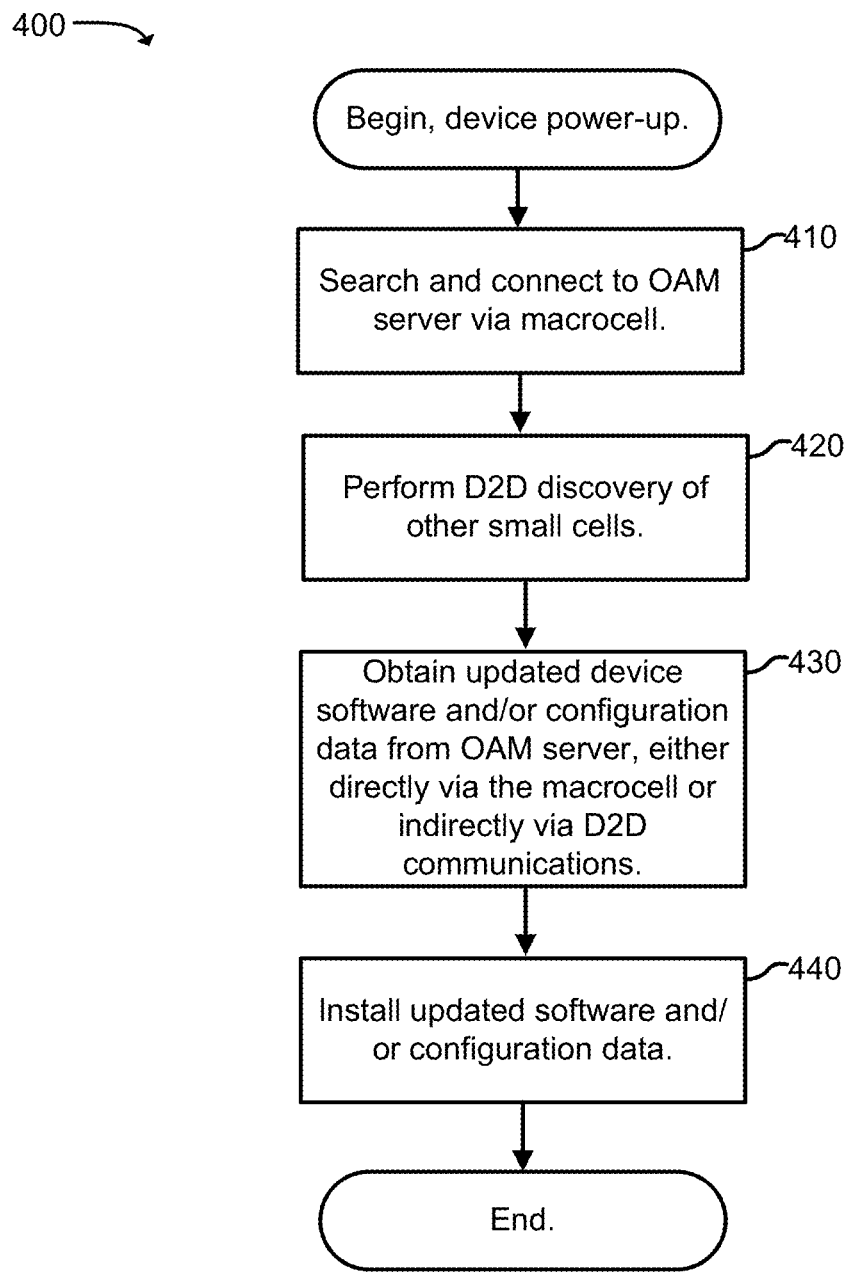
FIG. 4 is a flowchart of an example process for provisioning small cells.

FIG. 4 is a flowchart of an example process 400 for provisioning small cells 220. Process 400 may be performed by a small cell in response to initial powering-on of the small cell.

Process 400 may include searching and connecting to the OAM server via a macrocell (block 410). That is, on power-up, small cell 220 may attempt to attach to the cellular telecommunications network using a wireless connection to eNB 210. Cellular communications logic 320 may perform the attachment. In some deployments of small cell 220, the small cell may be out of range of a compatible macrocell. In this situation, the direct attachment of small cell 220, to eNB 210, will fail.

In one implementation, when attaching to the cellular telecommunications network, the small cell may be recognized, by the network, as a machine-to-machine (M2M) or Internet-of-Things (IoT) device. M2M/IoT devices may be given limited access permissions in the cellular telecommunications network. For example, MME 275 may assign the small cell limited access privileges, such that the small cell is limited to communicating with OAM server 260. In one implementation, profiles may be generated and maintained by a home subscriber server (HSS), associated with the core network, and assigned to small cells 220. The profiles may define the limited access permissions.

Process 400 may further include performing D2D discovery of other small cells (block 420). The D2D discovery may be performed to discover other small cells in small cell cluster 230. The small cell and the other small cell may form a self-organizing D2D local network.

D2D communications, as used herein, may refer to direct communications, using cellular communications logic 320, of small cells 220. The D2D communications may be performed using the D2D framework defined as part of LTE-Advanced (LTE-A) standards. For example, device discovery of direct communication paths between small cells 220 may be implemented as defined in the 3GPP technical specifications, such as in "3GPP TR 22.803, Technical Specification Group Services and Systems Aspects; Feasibility study for Proximity Services (ProSe) (Release 12)" (available at www.3gpp.org).

Process 400 may further include obtaining updated device software and/or configuration data (i.e., values for configurable parameters of the small cell) from the OAM server, either directly via the macrocell or indirectly via the D2D communications (block 430). When the small cell is able to attach to eNB 210, small cell 220 may directly communicate with OAM server 260 to obtain any updated software or configuration data for small cell 220. In one implementation, small cell 220 may transmit identification information to OAM server (e.g., a unique device identifier for the small cell). OAM server 260 may respond by looking up provisioning data specific to small cell 220. For example, a particular model or device type of small cell 220 may indicate that the operating system software (or other software) of small cell 220 should be updated. As another example, the particular small cell cluster 230, to which the small cell belongs, may be associated with particular configuration data. For instance, small cells deployed within a particular shopping center may be configured to use a particular set of frequencies, may use particular congestion control algorithms, or may use other parameters that are specific to the particular deployment of small cells. In general, configuration and operational parameters of small cell 220 may be updated during the initial provisioning of the small cell.

When small cell 220 is unable to directly attach to the macrocell, small cell 220 may still be able to obtain updated device software and/or configuration data, via D2D connections that were established with other small cells. Small cell clusters 230 may form a self-organizing D2D local network with other small cells in small cell cluster 230. As long as one of the small cells in the D2D local network is able to attach to eNB 210, the updated software and/or configuration data may be obtained and relayed through the small cell that is able to attach to the eNB. This may be particularly useful for small cell clusters that are deployed within buildings, as small cells within the interior of the building may not be able to obtain macrocell coverage, but may still be able to form D2D connections with neighboring small cells.

Process 400 may further include installing the updated software and/or configuration data (block 440). Installing the updated software and/or configuration data may effectively provision the small cell. In this manner, small cells 220, within a small cell cluster 230, may automatically, and without requiring a technician to visit the physical installation site of the small cell, may be provisioned for operation. In this scenario, small cell 220 may be self-installed by end-users. For example, IT personal associated with an office building may order a number of small cells for a small cell cluster 230. The IT personal, after receiving the small cells, may self-install the small cells by plugging-in the small cells (e.g., to a power outlet and to an Ethernet port) at various locations in the office building. The small cells, when powered-up, may automatically connect to a macrocell (e.g., to an eNB) and perform a self-setup procedure. Because the provisioning connection is made through the relatively robust macrocell infrastructure, the provisioning process may be performed even when the default configuration of small cell 220 does not correctly connect to ISP network 250.

Figure 5:
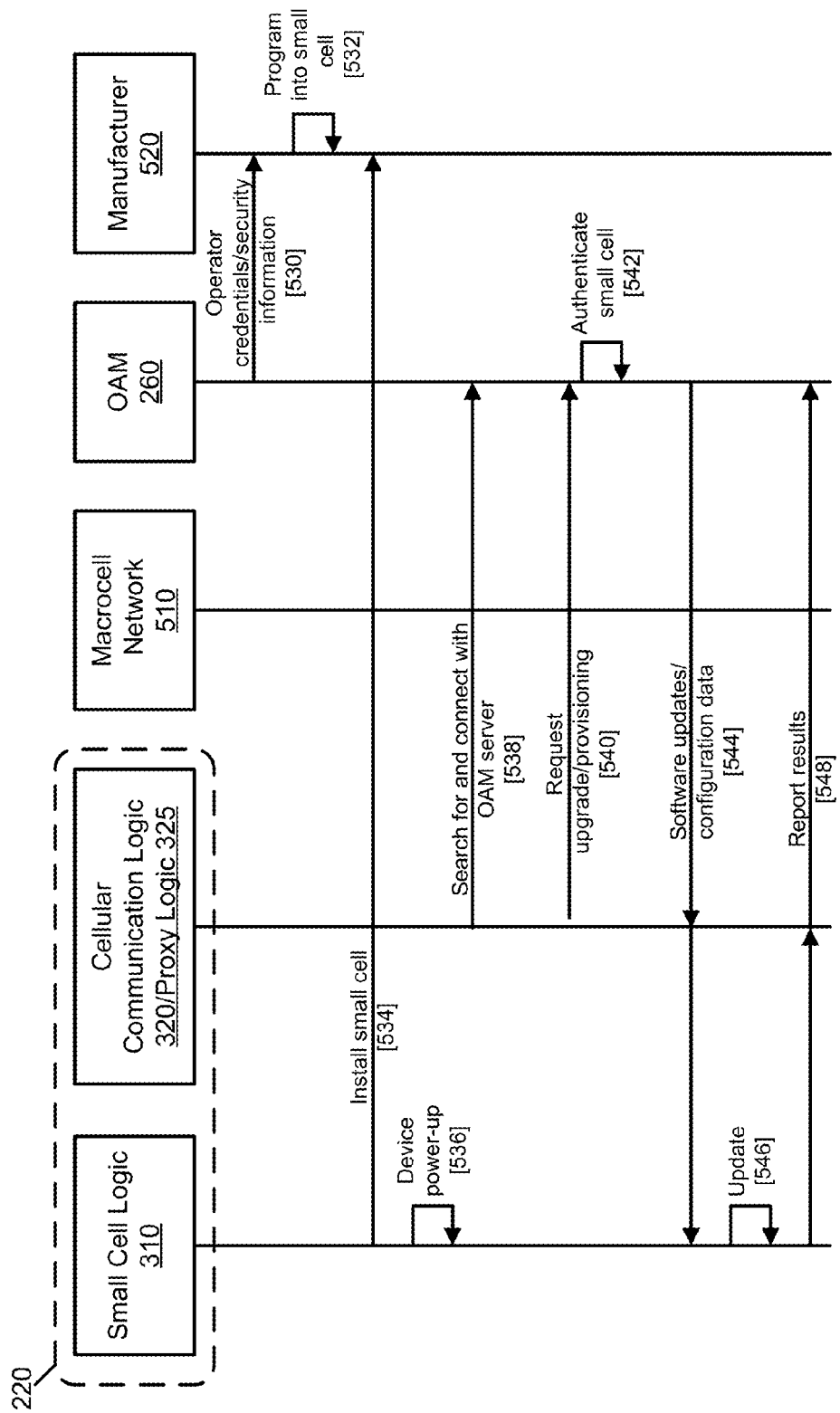
FIG. 5 is a diagram illustrating an example of operations that may be performed when provisioning a small cell consistent with the operations shown in the flowchart of FIG. 4.

FIG. 5 is a diagram illustrating an example of operations that may be performed when provisioning a small cell consistent with the operation shown in flowchart 400.

As illustrated in FIG. 5, small cell logic 310, cellular communication logic 320/proxy logic 325, macrocell network 510, OAM server 260, and manufacturer 520 may communicate with one another. Macrocell network 510 may represent the cellular telecommunications network, including eNBs 210 and the core network. Manufacturer 520 may represent an entity that manufactures and/or distributes small 220.

Manufacturer 520 may create small cells 220 to include security specifications approved by the operator of the cellular telecommunications network. For instance, as shown, OAM server 260 may, at some point, transmit operator credentials or security information (e.g., cryptographic certificates) to manufacturer 520 (at 530, "Operator credentials/security information"). The credentials and/or security information may be programmed into small cells 220 during manufacture (at 532, "Program into small cell").

At some point, small cells 220 may be provided to on-site personnel, such as IT personnel associated with building or other entity that is installing small cell cluster 230. Thus, small cells 220 may be provided to the customer as self-install devices. The on-site personnel may install small cells 220 (at 534, "Install small cell"). After installation of a small cell, the on-site personnel may power-up the small cell (at 536, "Device power-up").

As mentioned with respect to process 400, when initially powered, small cell 220 may search for and connect with OAM server 260 (538, "Search for and connect with OAM server"). The connection may be a direct connection with the macrocell or an indirect connection to another small cell via a D2D link. Small cell 220 may request initial upgrade and/or provisioning (at 540, "Request upgrade/provisioning"). OAM server 260 may correspondingly validate and/or authenticate the small cell, such as by using the operator credentials or security information that was embedded during manufacture (at 542, "Authenticate small cell").

OAM serve 260, in response to successful validation of small cell 220, may transmit software updates and/or configuration data to small cell 220 (at 544, "Software updates/configuration data"). The small cell may correspondingly update its operating software and/or configuration data (at 546, "Update"). Small cell 220 may report, to OAM server 260, the result of the software updates or the result of the updating of configuration information (at 548, "Report results").

As previously mentioned, communications between small cells within a small cell deployment may be performed using D2D communications. In D2D communications, cellular communications logic 320, of small cells 220, may be used to form D2D links, such as LTE-Advanced D2D links.

Figure 6:
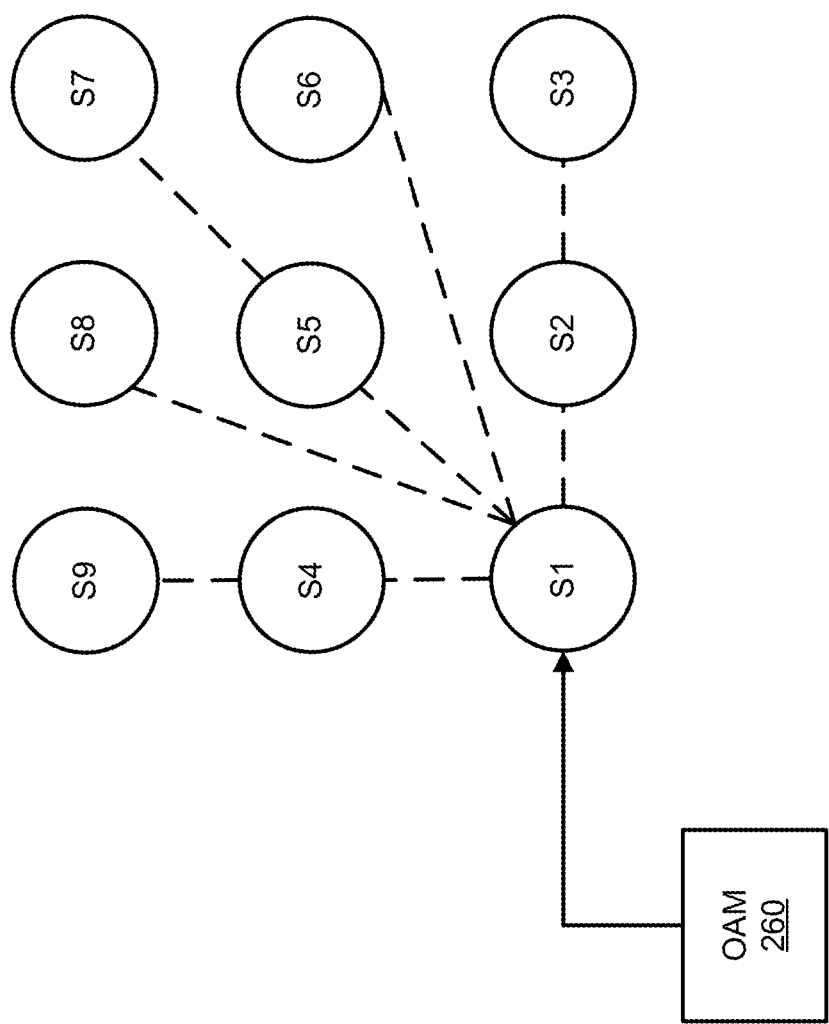
FIG. 6 is a diagram illustrating provisioning of small cells, in a small cell cluster, using D2D links.

FIG. 6 is a diagram illustrating provisioning of small cells 220, in a small cell cluster 230, using D2D links. As shown in FIG. 6, assume that nine small cells, labeled as small cells S1-S9, are part of a small cell deployment. Further, and as shown, only small cell S1 may be directly connected, via a macrocell, to OAM server 260. Small cells S2-S9 may be connected to one another via D2D wireless links, as illustrated by dashed lines in FIG. 6. For example, S1 may be directly connected to S2, S4, S5, and S8. Similarly, S4 may be directly connected to S9. S1 may serve as a relay, for S2-S9, for communications with OAM server 260. Some of small cells, such as small cell S9, may be connected to OAM server 260 via a multi-hop D2D connection (e.g., small cell S9 is connected to small cell S4, which is connected to small cell S1, which is connected to OAM server 260).

In one implementation, in the context of FIG. 6, when small cell S1 initially connects to OAM server 260, a software update may be downloaded to small cell S1. Small cell S1 may save the software update files, and may transmit the software update files to small cells S2-S9, as these small cells are powered-up. In this implementation, small cell S1 may effectively be designated as a "master" device that controls, at a local level, the provisioning of small cell S2-S9. Alternatively or additionally, small cells S2-S9 may communicate with OAM server 260 by using small cell S1 as a relay device (e.g., the small cells may act as routers to forward traffic, over the D2D links, to small cell S1, which may further route traffic, via a macrocell, to OAM server 260). As one example, small cells S2-S9 may obtain a copy of any software updates from small cell S1 (e.g., as an image file that is broadcast over the D2D links) but then report the status of the provisioning, to OAM server 260, using small cell S1 as a relay or router device.

With the techniques discussed above, small cells in a small cell cluster 230 may be automatically provisioned without requiring the physical presence of technicians associated with the cellular telecommunications network and without requiring a functioning backhaul link. Advantageously, large numbers of small cells can be cost-effectively deployed.

In addition to initial provisioning of small cells, concepts consistent with those described herein may be used to validate deployed small cells. The validation may include self-validation, which may refer to validating the correct operation of a small cell without requiring a manual process or the presence of an onsite engineer. The self-validation may include performing tests relating to radio coverage testing, speed testing, latency testing, and other radio parameter testing.

Figure 7:
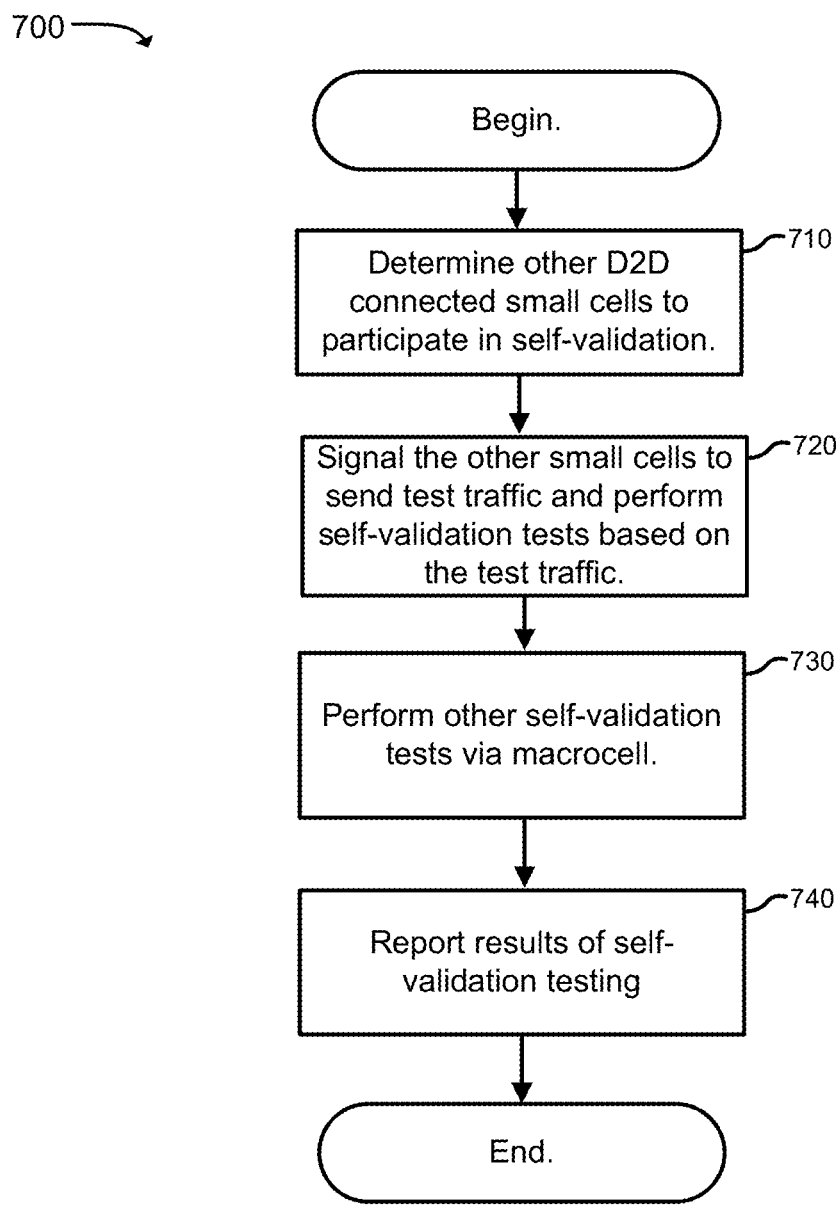
FIG. 7 is a flowchart of an example process for performing self-validation of small cells.

FIG. 7 is a flowchart of an example process 700 for performing self-validation of small cells 220. Process 700 may be performed by a small cells 220 in response to provisioning of the small cells or at another time.

Process 700 may include determining other D2D connected small cells to participate in the self-validation (block 710). As previously mentioned with respect to block 420 (FIG. 4), small cells 220 may connect, via direct connections, to other small cells within a small cell cluster 230. The other small cells may be used to assist in the self-validation procedure. In one implementation, the determination of which other small cells that are to participate in the self-validation may be performed using OAM server 260. That is, OAM server 260 may transmit an indication of the particular other small cells to the small cell that is performing the self-validation. Alternatively or additionally, the other small cells that participate in the self-validation may be locally determined as part of the D2D discovery process. The other small cells that are to participate may be selected based on the signal strength (when in UE mode, that is, when transmitting, using cellular communication logic 320, as a user UE) of the small cell, as received at the small cell that is to perform self-validation.

Process 700 may further include signaling the other small cells to send test traffic (block 720). The test traffic may be sent over the D2D links or over normal (UE mode) communication links Based on the test traffic, self-validation tests may be performed (block 720). For example, the other nearby small cells may transmit traffic to the small cell, which may measure the throughput rate of the small cell or the coverage or the latency introduced by the small cell. In some implementation, the other nearby small cells may send a large amount of traffic that is used to perform a "stress test." This stress test may indicate, for example, how well the small cell handles heavy load conditions.

Process 700 may further include performing other self-validation tests via the macrocell connection (block 730). That is, OAM server 260 and the small cell may exchange traffic to potentially perform other validation tests, such as additional tests relating to the configuration of the small cell (e.g., tests relating to the speed or security configuration of the small cell).

Process 700 may further include reporting the results of the self-validation testing (block 740). Small cell may, for example, transmit the results to OAM server 260. When the self-validation is successful, the small cell may begin to operate in normal operation mode (i.e., by providing coverage to mobile devices 240). Process 700 may be repeated for each small cell in small cell cluster 230.

Figure 8:
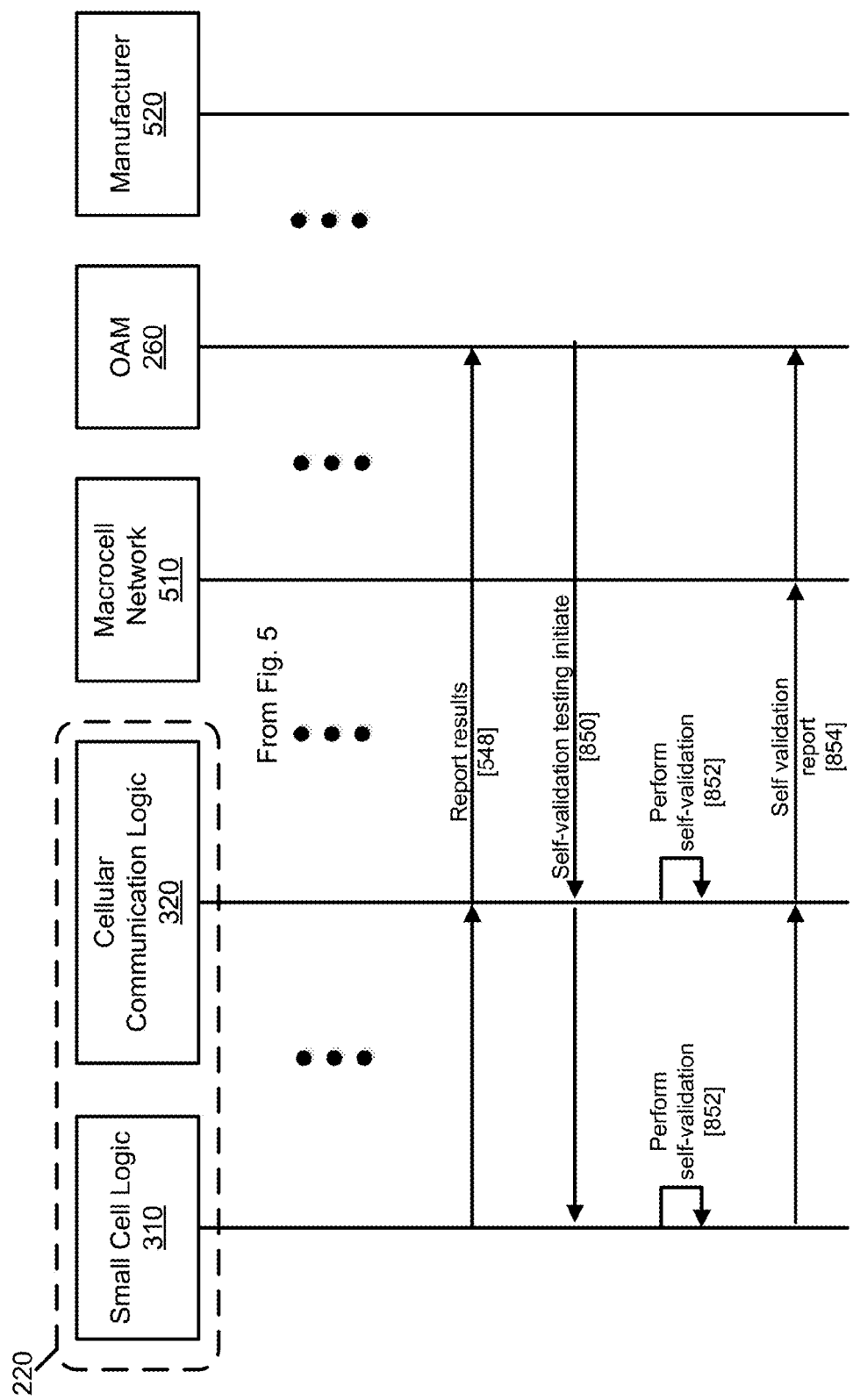
FIG. 8 is a diagram illustrating an example of operations that may be performed when validating a small cell consistent with the operation shown in the flowchart of FIG. 7.

FIG. 8 is a diagram illustrating an example of operations that may be performed when validating a small cell consistent with the operation shown in the flowchart of FIG. 7. The operations of FIG. 8 may be performed after the operations shown in FIG. 5. Thus, as shown, the first operation, illustrated in FIG. 8, corresponds to the last operation illustrated in FIG. 5 (at 548, "Report results").

OAM server 260, at some point (e.g., in response to completion of the initial provisioning of the small cell), may initiate self-validation testing (at 850, "Self-validation testing initiate"). OAM server 260 may initiate testing, via the macrocell connection, for a particular small cell that is to be validated.

The small cell may perform the self-validation (at 852, "Perform self-validation"). As discussed with respect to FIG. 5, the self-validation may include exchanging test traffic, via D2D links or in "normal" cellular UE mode, with other small cells via small cell cluster 230 (block 720, FIG. 7) and/or performing self-validation tests via the macrocells of the cellular telecommunications network. The small cell may report, to OAM server 260, the result of the self-validation testing (at 854, "Self-validation report").

Figure 9:
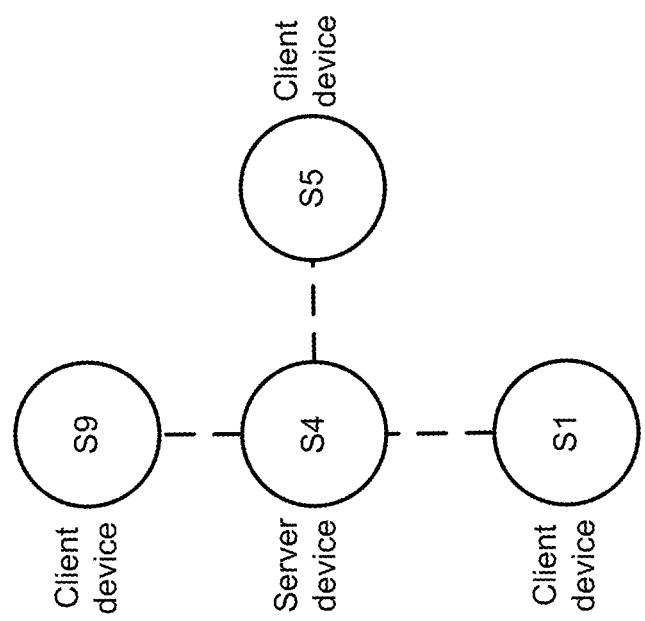
FIG. 9 is a diagram illustrating self-validation of a small cell, in a small cell cluster, using D2D links.

FIG. 9 is a diagram illustrating self-validation of a small cell, in a small cell cluster 230, using D2D links. As shown in FIG. 9, assume that the small cells S1, S4, S5 and S9 (e.g., from the small cell cluster shown in FIG. 6) are connected to one another via D2D wireless links. In this example, small cell S4 is the small cell for which validation is to be performed. Small cell S4 may act as a server device for the validation. Small cells S1, S5, and S9 may act as client devices for the validation. Smalls cells S1, S5, and S9 may provide, under the control of small cell S4, traffic to small cell S4. That is, smalls cells S1, S5, and S9 may act as mobile devices 240 (UEs) that generate traffic towards small cell S4. In one implementation, cellular communication logic 320 may forward the received traffic, via the 3GPP S1-U interface, towards small cell logic 310. Small cell logic 310 may be placed into loopback mode (e.g., by proxy logic 325). The loopbacked traffic may be received by proxy logic 325 and analyzed, such as to measure errors, throughput from various small cells S1, S5, and S9, and/or to measure latency. Once the self-validation has completed, small cell S4 may generate and forward a report, describing the results of the self-validation test(s), to OAM server 260. The report may be forwarded over the macrocell interface.

Figure 10:
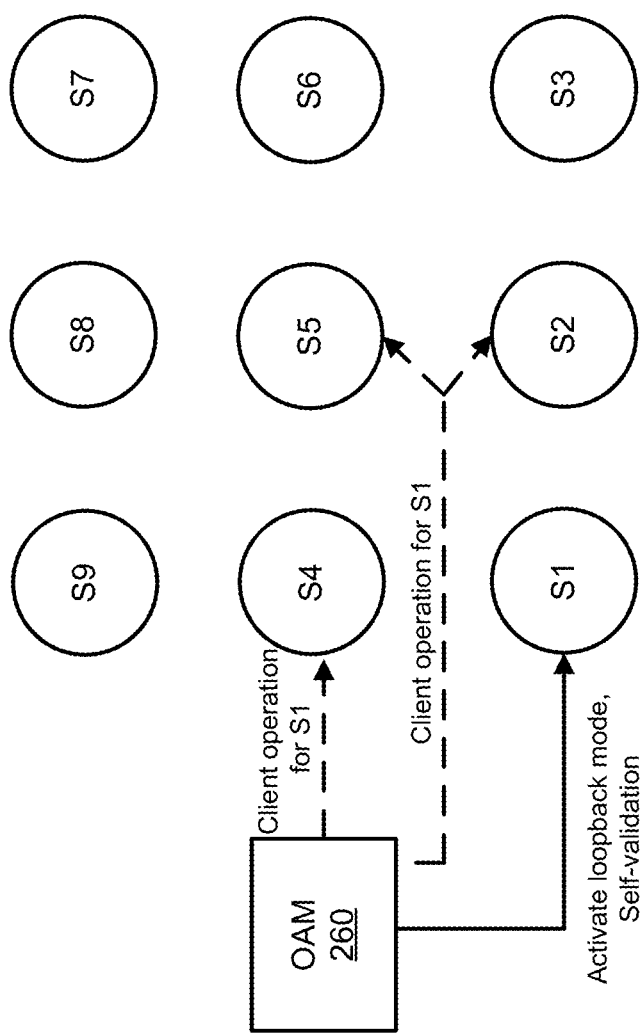
FIG. 10 is a diagram illustrating another example of self-validation of a small cell, in a small cell cluster, using D2D links.

FIG. 10 is a diagram illustrating another example of self-validation of a small cell, in a small cell cluster 230, using D2D links. As shown in FIG. 10, assume that the small cells S1-S9 are connected to one another via D2D wireless links. In this example, self-validation is controlled by OAM server 260 and small cell S1 is to be validated. OAM server 260 may indicate that small cell S1 is to begin self-validation, which may cause small cell S1 to enter loopback mode. Additionally, assume small cells S2, S4, and S5 are instructed, by OAM server 260, to act as clients for small cell S1. Small cells S2, S4, and S5 may provide traffic to small cell S1. That is, small cells S2, S4, and S5 may act as mobile devices 240 (UEs) that generate traffic towards small cell S1. Small cell S1 may implement self-validation in the manner discussed above, with reference to FIG. 9, for small cell S4. For example, because small cell S1 is operating in loopback mode, the proxy component of small cell S1 may receive the forwarded (loopbacked) traffic. The loopbacked traffic may be analyzed, such as to measure errors, throughput, and/or to measure latency. Once the self-validation has completed, small cell S1 may generate and forward a report, describing the results of the self-validation test(s), to OAM server 260. The report may be forwarded over the macrocell interface.

With the techniques discussed above, small cells in a small cell cluster 230 may automatically perform self-validation without requiring the physical presence of a technician associated with the cellular telecommunications network and without requiring a functioning backhaul link. Advantageously, large numbers of small cells can be cost-effectively deployed.

In some implementations, OAM server 260, after receiving the validation results of all of the small cells in small cell cluster 230, may use the results to determine global configuration parameters for the small cell cluster and/or to individually tune each of the small cells in the cluster. OAM server 260 may then update any changed parameters, via the macrocell link, at the effected small cells.

Figure 11:
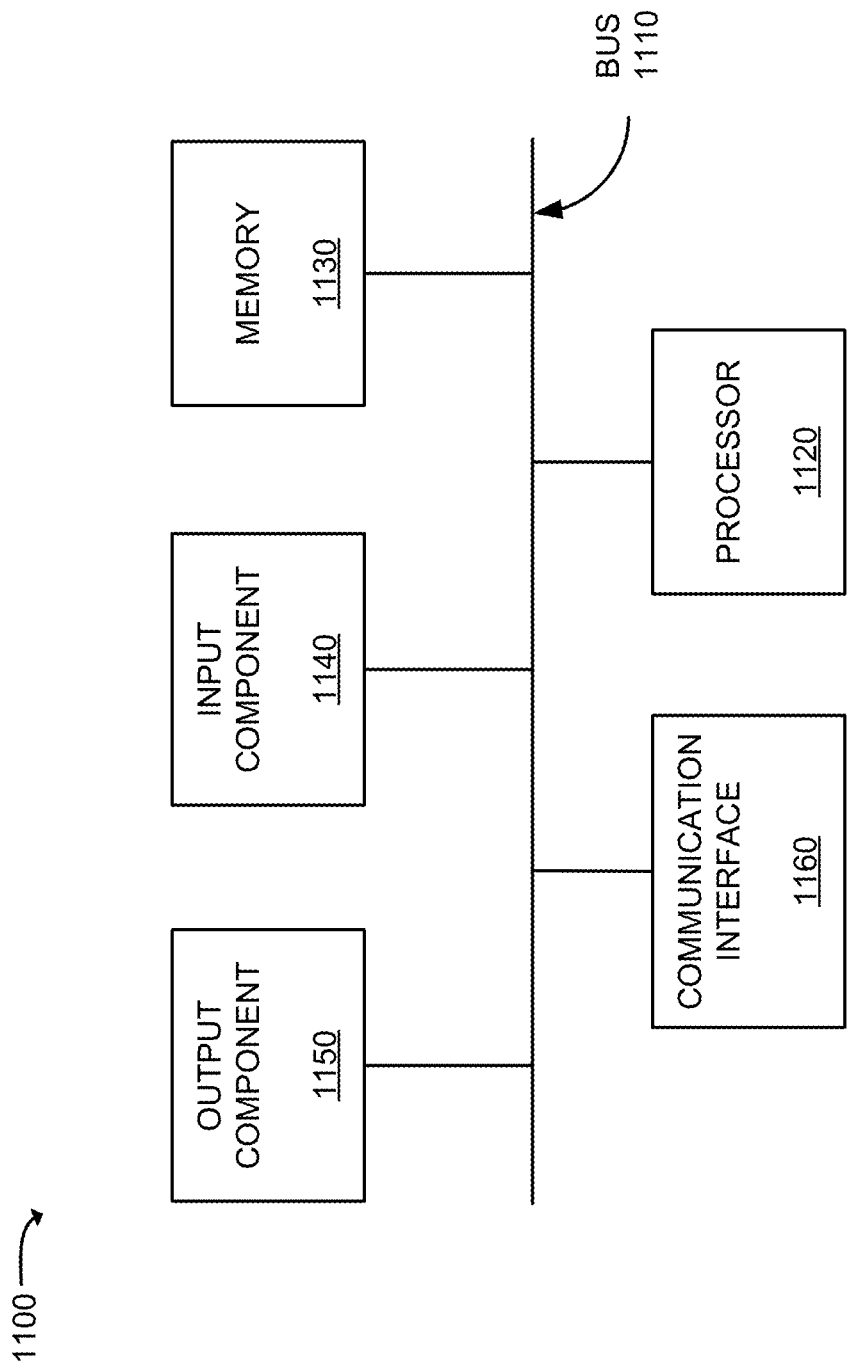
FIG. 11 is a diagram of example components of a device.

FIG. 11 is a diagram of example components of device 1100. One or more of the devices described above may include one or more devices 1100. Device 1100 may include bus 1110, processor 1120, memory 1130, input component 1140, output component 1150, and communication interface 1160. In another implementation, device 1100 may include additional, fewer, different, or differently arranged components.

Bus 1110 may include one or more communication paths that permit communication among the components of device 1100. Processor 1120 may include a processor, microprocessor, or processing logic that may interpret and execute instructions. Memory 1130 may include any type of dynamic storage device that may store information and instructions for execution by processor 1120, and/or any type of non-volatile storage device that may store information for use by processor 1120.

Input component 1140 may include a mechanism that permits an operator to input information to device 1100, such as a keyboard, a keypad, a button, a switch, etc. Output component 1150 may include a mechanism that outputs information to the operator, such as a display, a speaker, one or more light emitting diodes (LEDs), etc.

Communication interface 1160 may include any transceiver-like mechanism that enables device 1100 to communicate with other devices and/or systems. For example, communication interface 1160 may include an Ethernet interface, an optical interface, a coaxial interface, or the like. Communication interface 1160 may include a wireless communication device, such as an infrared (IR) receiver, a Bluetooth® radio, or the like. The wireless communication device may be coupled to an external device, such as a remote control, a wireless keyboard, a mobile telephone, etc. In some embodiments, device 1100 may include more than one communication interface 1160. For instance, device 1100 may include an optical interface and an Ethernet interface.

When device 1100 represents a small cell, communication interface 1160 may include one or more radio transceivers to transmit and receive data. Communication interface 1160 may additionally include a passive "sniffing" receiver to measure received signal strength.

Device 1100 may perform certain operations relating to one or more processes described above. Device 1100 may perform these operations in response to processor 1120 executing software instructions stored in a computer-readable medium, such as memory 1130. A computer-readable medium may be defined as a non-transitory memory device. A memory device may include space within a single physical memory device or spread across multiple physical memory devices. The software instructions may be read into memory 1130 from another computer-readable medium or from another device. The software instructions stored in memory 1130 may cause processor 1120 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described with regard to FIGS. 4, 5, 7, and 8, the order of the blocks and/or signals may be modified in other implementations. Further, non-dependent blocks and/or signals may be performed in parallel.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A small cell comprising:
    a non-transitory memory device storing a plurality of processor-executable instructions; and
    a processor configured to execute the processor-executable instructions, wherein executing the processor-executable instructions causes the processor to:
        attach, in response to power-up of the small cell, to an available macrocell of a cellular telecommunications network;
        discover, via direct device-to-device (D2D) communications, other small cells that are associated with a small cell cluster in which the small cell is a member;
        obtain provisioning data, for the small cell, from a server operated by an operator of the cellular telecommunications network, the provisioning data being obtained:
            indirectly from the server, via the D2D communications with one of the other small cells that are associated with the small cell cluster, when the small cell is unable to attach to an available macrocell and at least one other small cell, associated with the small cell cluster, is able to attach to the macrocell, and
            from the server and via the macrocell, when the small cell is able to attach to the macrocell;
        install the provisioning data to provision the small cell; and
        operate the small cell, to provide communication services, to one or more mobile devices, using a backhaul link that is different from a communication link corresponding to the attachment to the available macrocell and to the D2D communications.

2. The small cell of claim 1, wherein the D2D communications includes Long Term Evolution (LTE)-Advanced D2D communications.

3. The small cell of claim 1, wherein the provisioning data includes a software update file or configuration data associated with configurable parameters of the small cell.

4. The small cell of claim 3, wherein the configuration data includes the software update file, and wherein executing the processor-executable instructions causes the processor to:
    broadcast, via the D2D communications, the software update file to the other small cells in the small cell cluster.

5. The small cell of claim 1, wherein executing the processor-executable instructions causes the processor to:

receive, from one or more of the other small cells that are associated with the small cell cluster, test traffic, the test traffic being received as User Equipment (UE) mode traffic from the one or more of the other small cells; and analyze the received test traffic to obtain measurements relating to errors, latency, or throughput of the test traffic.

6. The small cell of claim 5, wherein executing the processor-executable instructions causes the processor to:
transmit results of the analysis, via the macrocell, to the server.

7. The small cell of claim 5, wherein executing the processor-executable instructions causes the processor to:
select the one or more other small cells, from which the test traffic is received, based on a signal strength of the UE mode traffic, received at the small cell, of the one or more other small cells.

8. The small cell of claim 1, wherein the provisioning data includes data relating to configuring the small cell to connect to the backhaul link.

9. A method, implemented by a small cell, comprising:
attaching, in response to power-up of the small cell, to an available macrocell of a cellular telecommunications network;
discovering, via direct device-to-device (D2D) communications, other small cells that are associated with a small cell cluster in which the small cell is a member;
obtaining provisioning data, for the small cell, from a server operated by an operator of the cellular telecommunications network, the provisioning data being obtained:
indirectly from the server, via the D2D communications with one of the other small cells that are associated with the small cell cluster, when the small cell is unable to attach to an available macrocell and at least one other small cell, associated with the small cell cluster, is able to attach to the macrocell, and
from the server and via the macrocell, when the small cell is able to attach to the macrocell;
installing the provisioning data to provision the small cell; and
operating the small cell, to provide communication services, to one or more mobile devices, using a backhaul link that is different from a communication link corresponding to the attachment to the available macrocell and to the D2D communications.

10. The method claim 9, wherein the D2D communications includes Long Term Evolution (LTE)-Advanced D2D communications.

11. The method of claim 9, wherein the provisioning data includes a software update file or configuration data associated with configurable parameters of the small cell.

12. The method of claim 11, wherein the configuration data includes the software update file, and wherein the method further comprising:
broadcasting, via the D2D communications, the software update file to the other small cells in the small cell cluster.

13. The method of claim 9, further comprising:
receiving, from one or more of the other small cells that are associated with the small cell cluster, test traffic, the test traffic being received as User Equipment (UE) mode traffic from the one or more of the other small cells; and
analyzing the received test traffic to obtain measurements relating to errors, latency, or throughput of the test traffic.

14. The method of claim 13, further comprising:
transmitting results of the analysis, via the macrocell, to the server.

15. The method of claim 13, further comprising:
selecting the one or more other small cells, from which the test traffic is received, based on a signal strength of the UE mode traffic, received at the small cell, of the one or more other small cells.

16. The method of claim 9, wherein the provisioning data includes data relating to configuring the small cell to connect to the backhaul link.

17. A small cell device comprising:
an interface to an Internet Service Provider (ISP) operator network;
a non-transitory memory device storing a plurality of processor-executable instructions; and
a processor configured to execute the processor-executable instructions, wherein executing the processor-executable instructions causes the processor to:
attach, in response to power-up of the small cell, to an available macrocell of a telecommunications network;
discover, via direct device-to-device (D2D) communications, other small cells that are associated with a small cell cluster in which the small cell is a member;
provision the small cell based on provisioning data received from a server operated by an operator of the telecommunications network, the provisioning data being obtained indirectly from the server via one or more of the other small cells that are associated with the small cell cluster;
operate the small cell, to provide communication services, to one or more mobile devices, using a backhaul link implemented via the ISP network; and
perform self-validation of the small cell by receiving test traffic via the macrocell of the telecommunications network or via D2D communications.

18. The small cell device of claim 17, wherein performing the self-validation includes configuring the small cell to operate in loopback mode.

19. The small cell device of claim 17, wherein performing the self-validation further includes causing the processor to:
receive, from one or more of the other small cells that are associated with the small cell cluster, test traffic, the test traffic being received as User Equipment (UE) mode traffic from the one or more of the other small cells; and
analyze the received test traffic to obtain measurements relating to errors, latency, or throughput of the test traffic.

20. The small cell device of claim 17, wherein the provisioning data includes data relating to configuring the small cell to connect to the backhaul link.

* * * * *